(12) United States Patent
Hansen (10) Patent No.: US 6,772,631 B2
(45) Date of Patent: Aug. 10, 2004

(54) VEHICLE WHEEL BALANCER

(76) Inventor: Allan H. Hansen, 19126 Double Eagle Dr., Cornelius, NC (US) 28031

( * ) Notice: Subject to any disclaimer, the term of this patent is extended or adjusted under 35 U.S.C. 154(b) by 173 days.

(21) Appl. No.: 09/943,790

(22) Filed: Aug. 31, 2001

(65) Prior Publication Data

US 2003/0046999 A1 Mar. 13, 2003

(51) Int. Cl.[7] .................................................. G01M 1/00
(52) U.S. Cl. ........................................... 73/487; 73/460
(58) Field of Search ........................... 73/487, 460, 66, 73/459, 462

(56) References Cited

U.S. PATENT DOCUMENTS

| | | | |
|---|---|---|---|
| 4,188,828 A | * | 2/1980 | Cuccolini .................... 73/460 |
| 4,332,169 A | | 6/1982 | Stuart |
| 4,462,253 A | * | 7/1984 | Becher ........................ 73/487 |
| 4,699,431 A | * | 10/1987 | Daberkoe ...................... 301/1 |
| 5,419,193 A | * | 5/1995 | Borner et al. ................. 73/462 |
| 5,948,980 A | | 9/1999 | Rossteuscher |
| 5,987,761 A | | 11/1999 | Ohnesorge |
| 6,059,378 A | * | 5/2000 | Dougherty et al. ...... 301/124.1 |
| 6,481,281 B1 | * | 11/2002 | Gerdes ........................ 73/460 |
| 6,619,120 B2 | * | 9/2003 | Hansen ........................ 73/487 |

* cited by examiner

Primary Examiner—Hezron Williams
Assistant Examiner—Jacques M Saint-Surin
(74) Attorney, Agent, or Firm—Schwartz Law Firm, P.C.

(57) ABSTRACT

A vehicle wheel balancer obtains data relative to the imbalance of a vehicle wheel. The wheel balancer includes a rotatable shaft having a free end adapted for extending through a center hole of the wheel, and a proximal end opposite the free end. A locating hub is carried on the shaft, and is adapted for engaging a first side of the wheel to locate the wheel on the balancer. A centering sleeve is carried on the shaft adjacent the locating hub, and is adapted for extending through the center hole of the wheel to center the wheel relative to the shaft. The centering sleeve is releasably locked onto the wheel balancer, such that the centering sleeve remains secured to the wheel balancer upon removal of the wheel from the shaft.

19 Claims, 7 Drawing Sheets

VEHICLE WHEEL BALANCER

TECHNICAL FIELD AND BACKGROUND OF THE INVENTION

This invention relates generally to the wheel balancing industry, and more specifically, to a vehicle wheel balancer adapted for determining the location and degree of imbalance of a vehicle wheel prior to mounting the wheel on a vehicle. The invention utilizes an improved centering sleeve which functions to center the wheel about a rotational axis defined by the balancer shaft. In order to obtain accurate balancing results, the wheel must remain precisely centered during operation of the wheel balancer. Upon rotation of the wheel, conventional electronic sensors and circuitry acquire data indicating the appropriate placement of balancing weights on the wheel. Proper wheel balancing is essential to achieving a smooth, vibration-free drive.

Centering sleeves, also known as "cones", have been used in the wheel balancing industry for many years. In order to accommodate wheels for passenger cars, light trucks, SUVs, and vans, centering sleeves must cover a variety of wheel hole sizes ranging generally from 42 mm to 133 mm in diameter. In the past, it was preferable to have only a few different sleeves, generally 3–5, each of which fit a range of several different wheel hole sizes so that an operator could readily determine which sleeve to use for the particular wheel to be balanced. To meet this need, relatively high-angle conical sleeves were developed. While these sleeves could accommodate many different wheel sizes, it was discovered that because of their relatively high angle, wheel centering was less precise causing the balancing results to be less accurate.

In the industry today, it is well accepted that a low angle sleeve provides better wheel centering and more accurate results. Indeed, a very low angle sleeve, one which is nearly cylindrical, will generally give the most accurate and repeatable balancing results.

Nevertheless, the low-angle sleeves have drawbacks and limitations. Since the angle is low, an operator must have access to several different sleeves—generally, 25 or more—in order to cover the entire standard range of wheel hole sizes. Proper selection of a centering sleeve for a given wheel is generally achieved through trial and error, and/or time-consuming measurements. In some cases, an operator simply uses the wrong sleeve size to balance the wheel. Moreover, because of the low angle of these sleeves, the wheel fits more tightly on the sleeve. Standard "wing nut" tighteners exert a force of as much as 3 to 3.5 tons of static pressure to torque the wheel onto the balancer. When the wheel is removed after operation of the balancer, the centering sleeve generally sticks in the wheel hole creating a frictional attachment which is often difficult to release without damaging the sleeve and/or wheel. Despite these problems, the increased importance of proper wheel balancing in today's vehicles is driving the industry toward the use of low-angle centering sleeves.

The present invention addresses a need in the industry for a vehicle wheel balancer using a low-angle sleeve which produces accurate balancing results in a timely and efficient manner. Unlike other low-angle sleeves, the present sleeve does not lodge in the wheel hole as the wheel is removed from the balancer. Moreover, by utilizing a specially-designed electronic or mechanical tool for matching the proper centering sleeve to a given wheel, the guess-work otherwise required when selecting a low-angle sleeve is eliminated. Alternatively, the sleeves may be color-coded, numbered, or marked with other suitable indicia used to match the appropriate sleeve to the given wheel based on information provided on a selection chart.

SUMMARY OF THE INVENTION

Therefore, it is an object of the invention to provide an improved centering sleeve for a vehicle wheel balancer. The term "centering sleeve" as used herein is broadly defined as any cylindrical or conical device designed for centering the vehicle wheel relative to a rotational axis defined by the balancer shaft.

It is another object of the invention to provide a centering sleeve which has a low angle and will not lodge within the center hole of the vehicle wheel when the wheel is removed from the balancer.

It is another object of the invention to provide a centering sleeve which releasably locks to the wheel balancer, and is conveniently interchanged with similar sleeves of different sizes in order to accommodate vehicle wheels having center holes ranging from 42 mm to 133 mm in diameter.

It is another object of the invention to provide a measuring device which measures the center hole of the vehicle wheel, and indicates by (number, letter, color, etc.) the appropriate sleeve required for use on the wheel balancer in order to obtain accurate balancing results.

It is another object of the invention to provide an improved vehicle wheel balancer especially adapted for balancing steel and alloy wheels used on passenger vehicles, SUVs, vans, and light trucks.

It is another object of the invention to provide an improved method for balancing a vehicle wheel.

These and other objects of the present invention are achieved in the preferred embodiments disclosed below by providing a vehicle wheel balancer for obtaining data relative to the imbalance of a vehicle wheel. The wheel balancer includes a centering shaft having a free end adapted for extending through a center hole of the wheel, and a proximal end opposite the free end. Means are provided for rotating the centering shaft. A locating hub is carried on the shaft, and is adapted for engaging a first side of the wheel to locate the wheel on the balancer. A centering sleeve is carried on the shaft adjacent the locating hub, and is adapted for extending through the center hole of the wheel to center the wheel relative to the shaft. Means are provided for locking the centering sleeve to the wheel balancer, such that the centering sleeve remains secured to the wheel balancer upon removal of the wheel from the shaft. A mounting member is carried on the shaft, and is adapted for engaging a second side of the wheel. The wheel is sandwiched between the mounting member and the locating hub such that the mounting member, locating hub, and centering sleeve cooperate to secure the wheel in a centered position relative to the shaft during wheel-balancing rotation of the wheel.

Preferably, the means for rotating the centering shaft includes an electric motor and drive shaft mounted within a journal bearing. The drive shaft and centering shaft may be integrally formed together, or formed separately and operatively coupled. Alternatively, the centering shaft may be rotated manually by hand-rotating the wheel. The means for rotating the centering shaft in this embodiment includes the journal bearing.

Preferably, the mounting member is a mounting flange plate. Alternatively, the mounting member may be a pressure cup and/or wingnut.

According to another preferred embodiment of the invention, the locating hub has an annular face plate adapted for engaging the wheel, and an integrally-formed cup defining an internal cavity for receiving a portion of the centering sleeve.

According to another preferred embodiment of the invention, a spring is positioned within the cavity of the locating hub, and is adapted for urging the centering sleeve into the center hole of the wheel.

According to another preferred embodiment of the invention, a floating spring cover is movable within the cavity of the locating hub and resides between the spring and centering sleeve.

According to another preferred embodiment of the invention, the means for locking the centering sleeve to the wheel balancer includes a locking bolt extending outwardly from the centering sleeve towards the floating spring cover. The floating spring cover defines an opening for receiving and holding a free end of the locking bolt to secure the centering sleeve to the wheel balancer.

According to another preferred embodiment of the invention, the locking bolt has an enlarged head. The opening in the floating spring cover defines an enlarged portion adapted for receiving the head of the bolt and a narrow portion communicating with the enlarged portion. After inserting the bolt head through the enlarged portion of the opening, the centering sleeve is rotated to locate the bolt head along the narrow portion of the opening such that the bolt head engages the floating spring cover to lock the centering sleeve to the wheel balancer.

According to another preferred embodiment of the invention, the means for locking the centering sleeve to the wheel balancer includes one or more locking clips, mating screw threads, interfering shoulders, projecting fingers, and the like.

According to another preferred embodiment of the invention, the free end of the centering shaft has an external screw thread.

According to another preferred embodiment of the invention, a wing nut is applied to the free end of the centering shaft. The wing nut has a complementary internal screw thread mating with the external thread of the centering shaft to releasably secure the wheel between the locating hub and mounting member.

In another embodiment, the invention is a wheel centering assembly for a vehicle wheel balancer adapted for obtaining data relative to the imbalance of a vehicle wheel. The wheel centering assembly includes a centering shaft having a free end adapted for extending through a center hole of the wheel, and a proximal end. A locating hub is carried on the centering shaft, and is adapted for engaging a first side of the wheel to locate the wheel on the balancer. A centering sleeve is carried on the shaft adjacent the locating hub, and is adapted for extending through the center hole of the wheel to center the wheel relative to the shaft. Means are provided for locking the centering sleeve to the wheel balancer, such that the centering sleeve remains secured to the wheel balancer upon removal of the wheel from the shaft. A mounting member is carried on the shaft, and is adapted for engaging a second side of the wheel. The wheel is sandwiched between the mounting member and the locating hub. The mounting member, locating hub, and centering sleeve cooperate to secure the wheel in a centered position relative to the shaft during wheel-balancing rotation of the wheel.

In yet another embodiment, the invention is a centering sleeve adapted for extending through a center hole of a vehicle wheel mounted on a vehicle wheel balancer to center the wheel relative to a rotatable balancer shaft. The centering sleeve includes means for locking the sleeve to the wheel balancer, such that the sleeve remains secured to the wheel balancer upon removal of the wheel from the balancer shaft.

According to another preferred embodiment of the invention, the centering sleeve includes an enlarged base adapted for engaging a floating spring cover movable within a cavity defined by a locating hub of the wheel balancer.

According to another preferred embodiment of the invention, the means for locking the centering sleeve to the wheel balancer includes a locking bolt extending outwardly from the base. The locking bolt is adapted for being inserted and held within an opening formed with the floating spring cover to secure the centering sleeve to the wheel balancer.

In yet another embodiment, the invention is a method for balancing a vehicle wheel. The method includes the steps of mounting the wheel on a vehicle wheel balancer including a rotatable shaft. The wheel is centered relative to the shaft using a centering sleeve extending into a center hole of the wheel. With the wheel mounted and centered, the shaft is rotated to obtain data relative to the imbalance of the wheel. After the data is obtained, the wheel is removed from the wheel balancer while simultaneously dislodging the centering sleeve from the wheel hole.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED
EMBODIMENT AND BEST MODE

Figure 1:
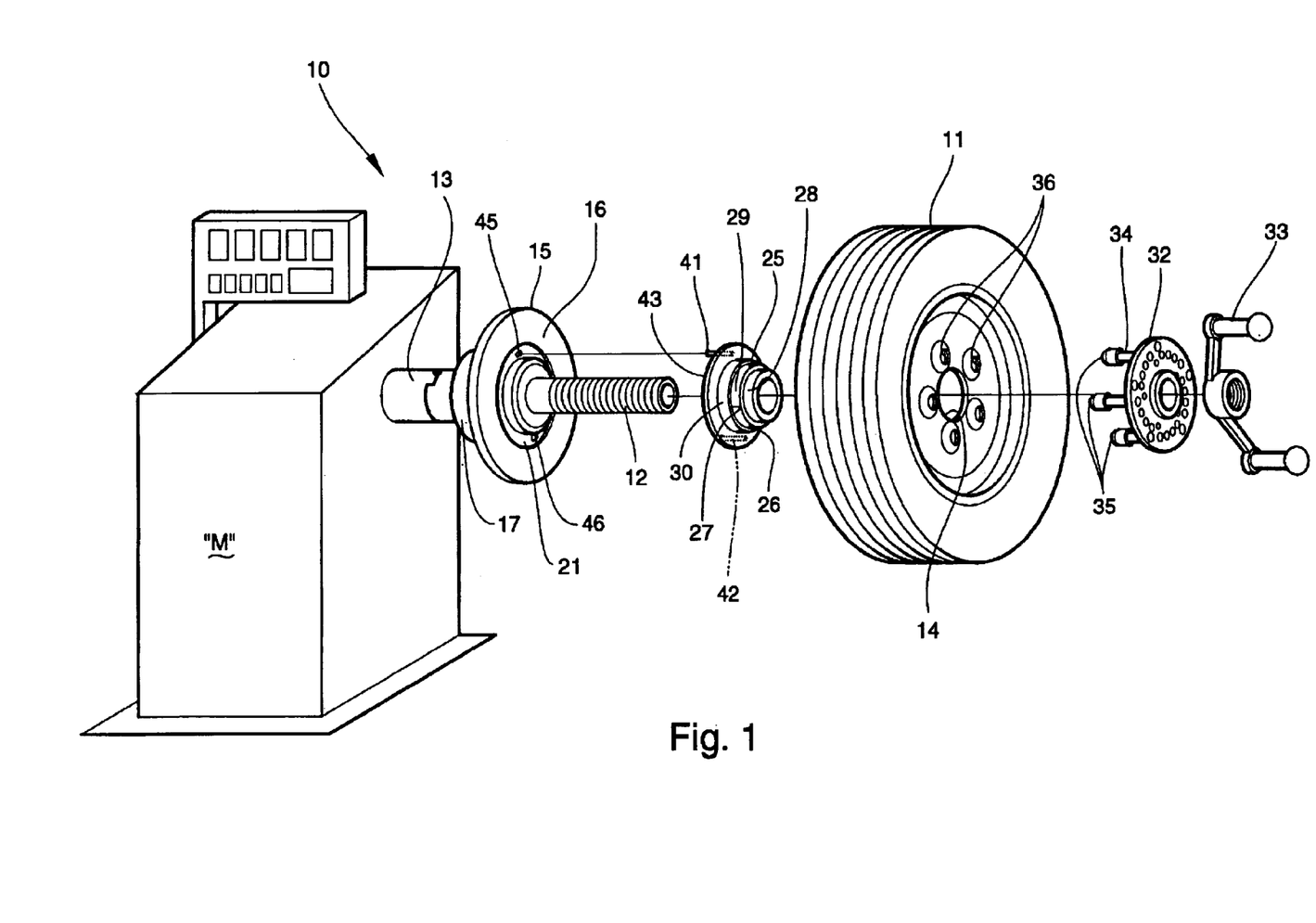
FIG. 1 is a perspective view of a vehicle wheel balancer according to one preferred embodiment of the invention with certain components of the wheel balancer pulled away to demonstrate their assembly on the centering shaft.

Referring now specifically to the drawings, a vehicle wheel balancer according to the present invention is illustrated in FIG. 1 and shown generally at reference numeral 10. The wheel balancer 10 is adapted for determining the location and degree of imbalance of a vehicle wheel 11 prior to mounting the wheel 11 on a vehicle.

Figure 2:
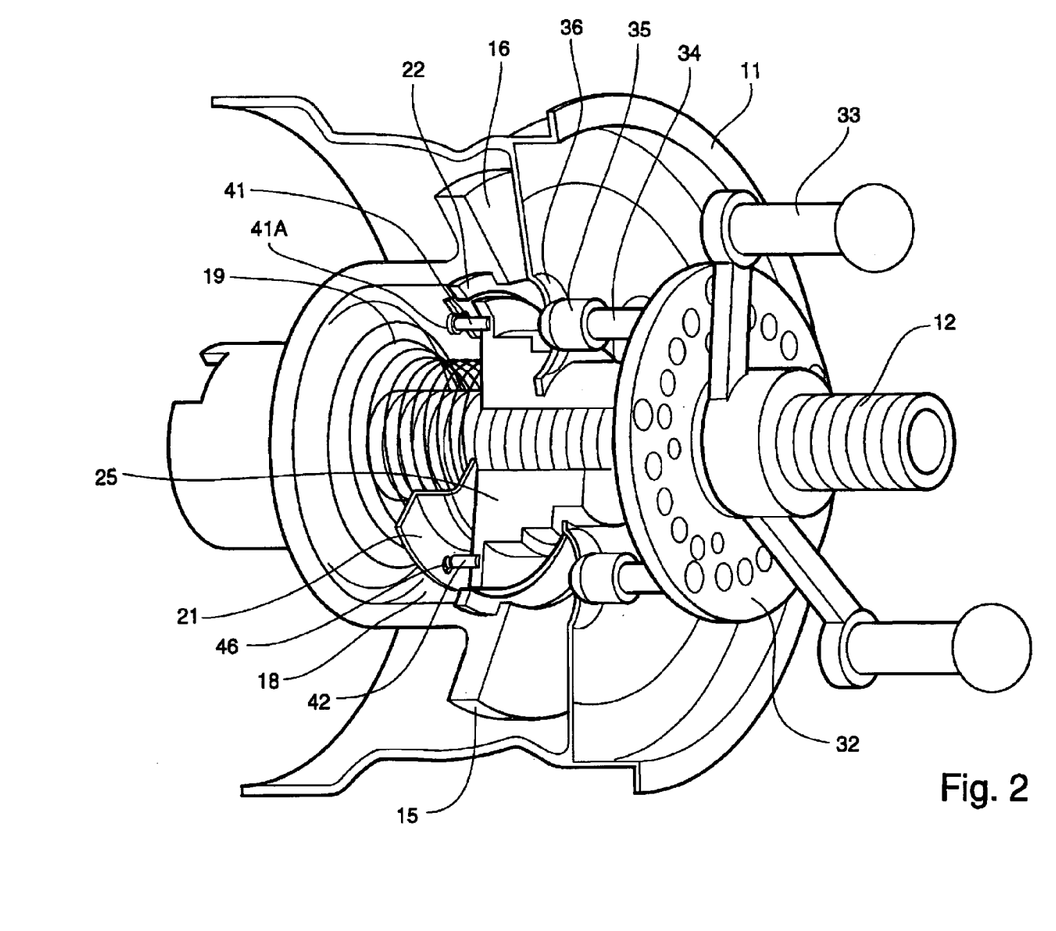
FIG. 2 is a cross-sectional view of the wheel centering assembly with the wheel mounted on the centering shaft.

Referring to FIGS. 1 and 2, the vehicle wheel 11 is carried on a rotatable centering shaft 12 having a proximal end operatively coupled to a drive shaft 13 of the balancer motor "M", and a threaded free end adapted for extending through a center hole 14 of the wheel 11. A locating hub 15 is mounted on the centering shaft 12, and includes an annular face plate 16 and integrally-formed cup 17. As best shown in FIG. 2, the cup 17 defines an internal cavity 18 containing a conical spring 19 and floating spring cover 21. The spring cover 21 is adapted to float within the cavity 18 when pushed against the biasing force of the spring 19. An annular retaining flange 22 located at the mouth of the cavity 18 adjacent the face plate 16 retains the spring cover 21 inside the cavity 18.

Figure 3:
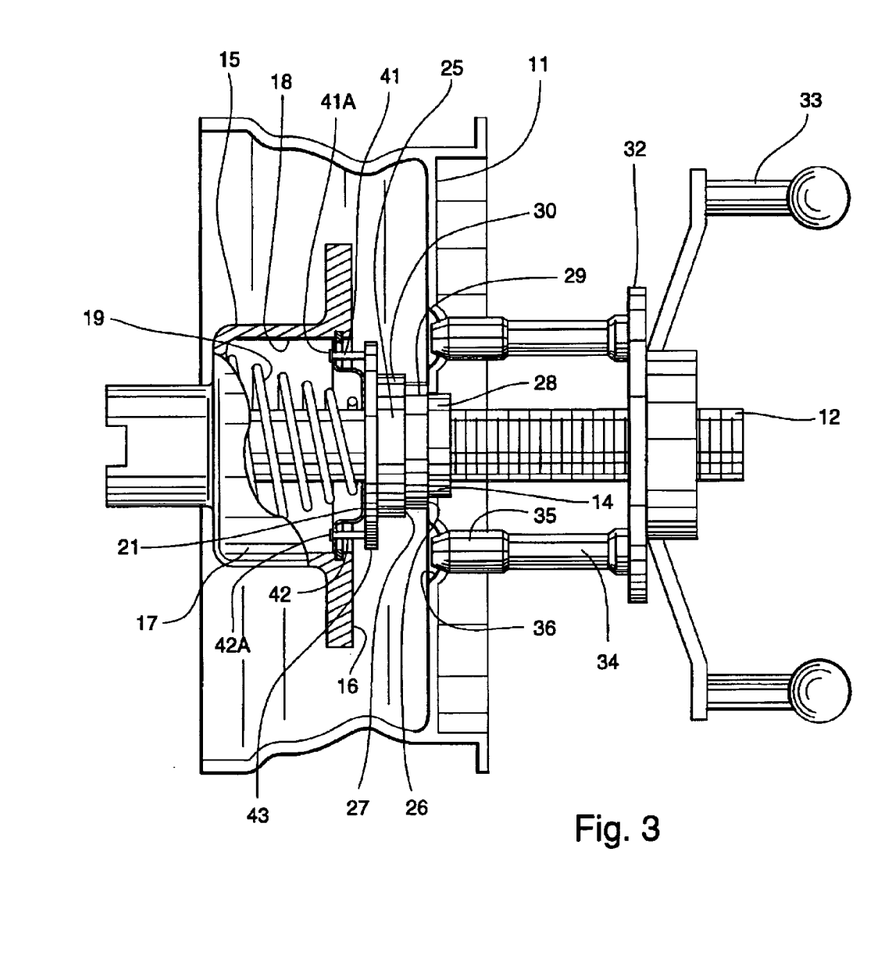
FIG. 3 is a further cross-sectional view of the wheel centering assembly, and showing the position of the vehicle wheel prior to torquing the wheel onto the balancer.
Figure 4:
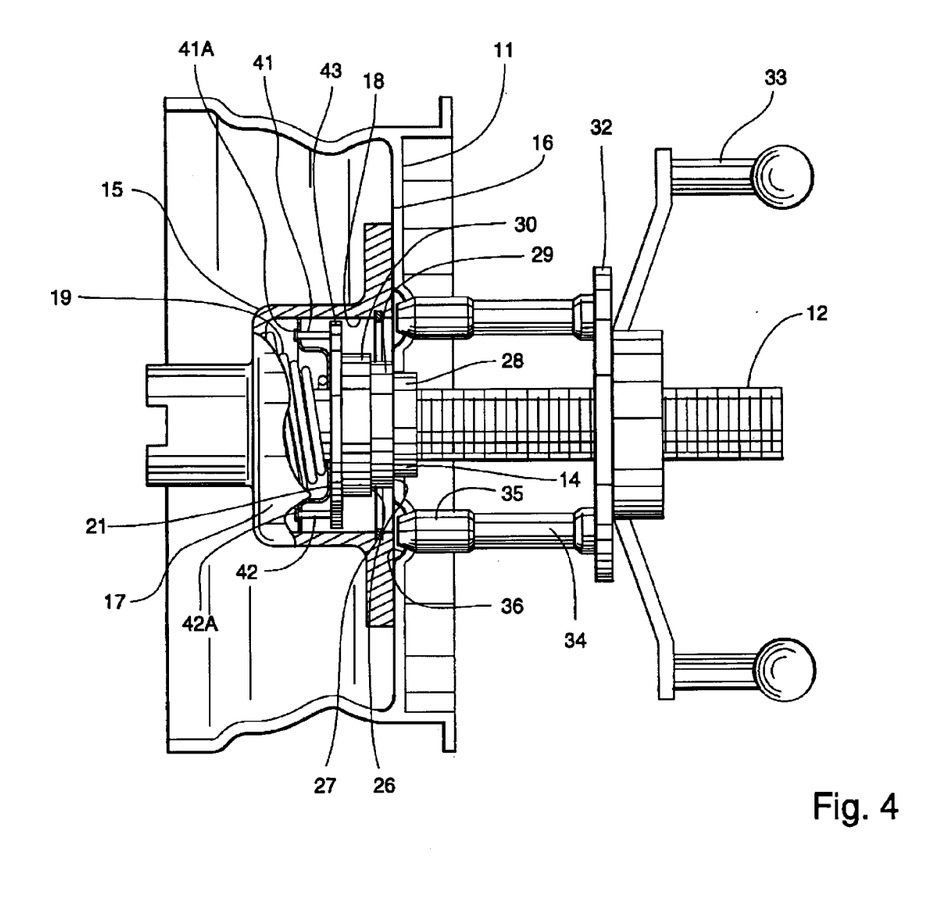
FIG. 4 is a cross-sectional view of the wheel centering assembly with vehicle wheel torqued onto the balancer.

An exchangeable centering sleeve 25 resides between the vehicle wheel 11 and locating hub 15 to pre-center the wheel 11 relative to a rotational axis defined by the centering shaft 12. Preferably, the sleeve 25 has a number of steps 26 and 27 which form respective low-angle cone portions 28, 29, 30 of different sizes. The vehicle wheel 11 engages the appropriate cone portion 28, 29, 30 at the center hole 14, as shown in FIG. 3, and is torqued onto the balancer 10 by a mounting flange plate 32 and internally-threaded wing nut 33. The flange plate 32 includes a number of elongated centering studs 34 having respective enlarged heads 35 adapted for engaging the wheel 11 at the lug holes 36. The size of the stud heads 35 is slightly larger than the diameter of the lug holes 36 to prevent penetration of the studs 34 through the wheel 11. As the wingnut 33 is tightened along the threaded centering shaft 12, the centering studs 34 of the flange plate 32 force the wheel 11 against the annular face plate 16 of the locating hub 15, as shown in FIG. 4. A portion of the centering sleeve 25 is pushed into the cavity 18 while the conical spring 19 bears against the spring cover 21 to urge the sleeve 25 into the wheel hole 14.

Once the wheel 11 is properly mounted, centered, and torqued, as described above, the balancer motor "M" is activated to rotate the drive shaft 13 causing rotation of the centering shaft 12 and wheel 11. During operation of the balancer 10, conventional electronic sensors and circuitry acquire data indicating the appropriate placement of balancing weights on the wheel 11. The wheel 11 preferably rotates at a speed as low as 50 rpm. When balancing is completed, the wingnut 33 and flange plate 32 are removed from the balancer 10 and the wheel 11 removed from the centering shaft 12. Alternatively, the wheel balancer 10 does not include an electric motor "M". In this embodiment, the wheel 11 is manually rotated to acquire the necessary balancing data.

Figure 5:
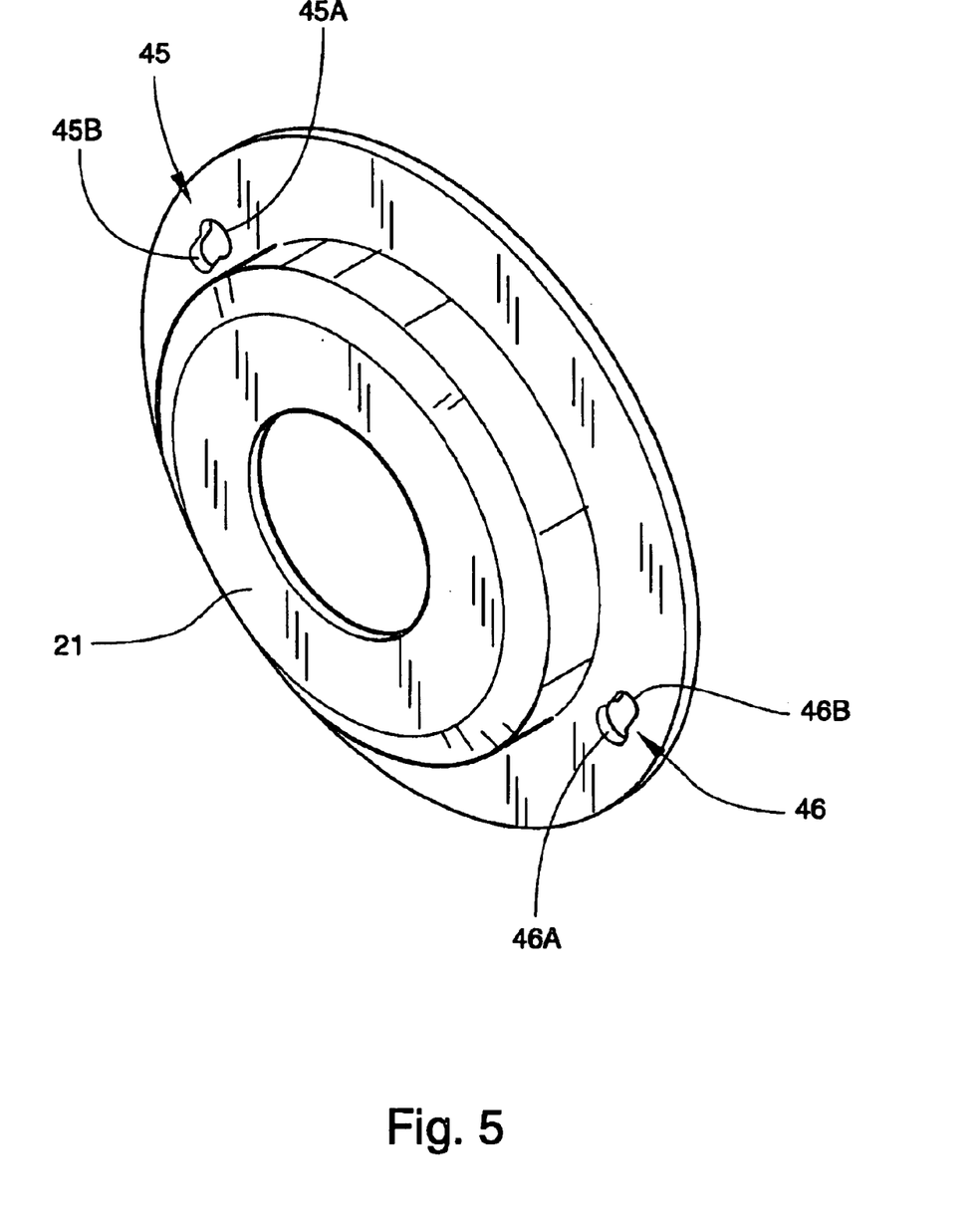
FIG. 5 is a perspective view of the spring cover.
Figure 6:
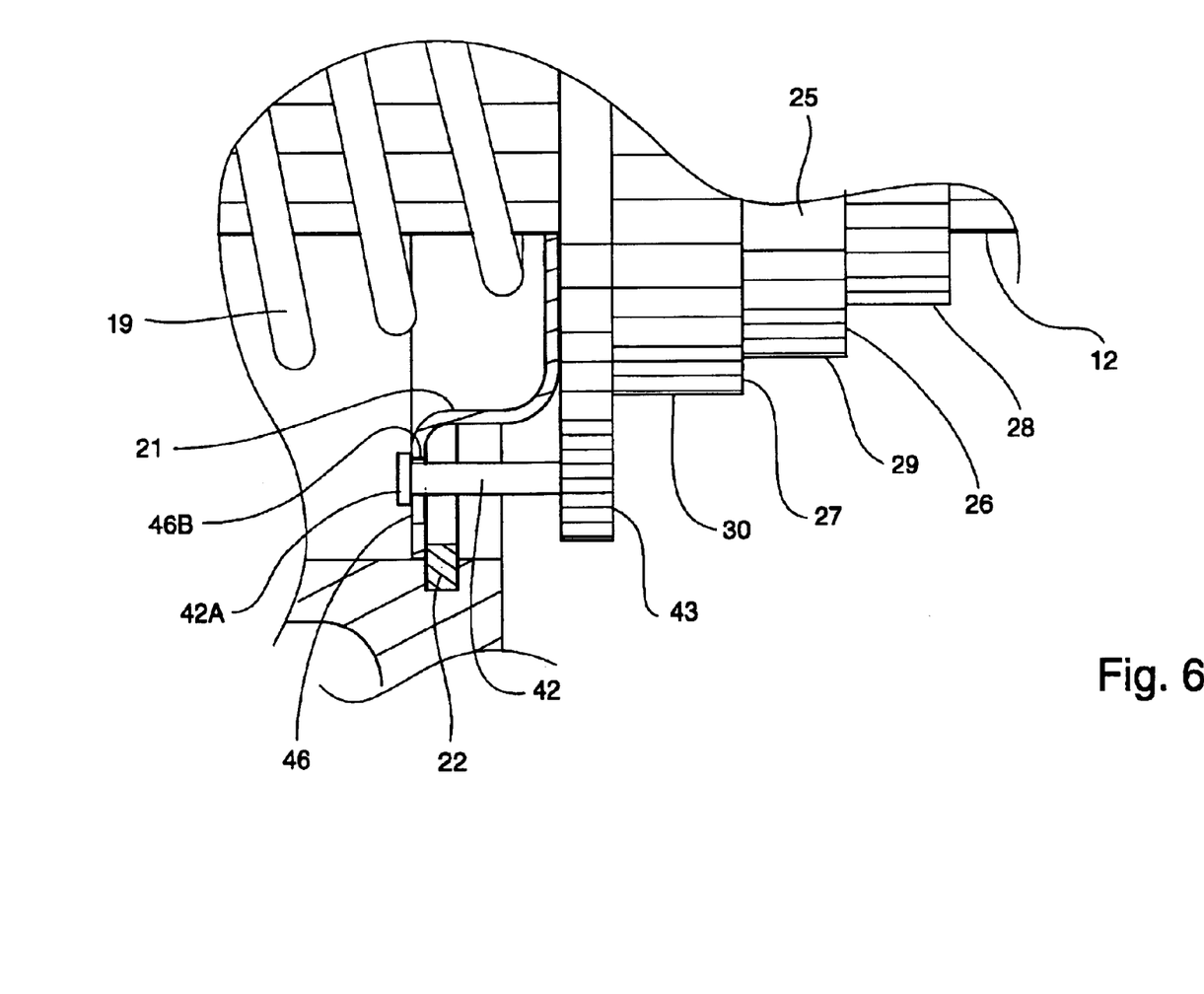
FIG. 6 is a fragmentary cross-sectional view of the centering sleeve and locating hub, and showing the locking bolt in a locking position adjacent the narrow portion of the opening in the spring cover.
Figure 7:
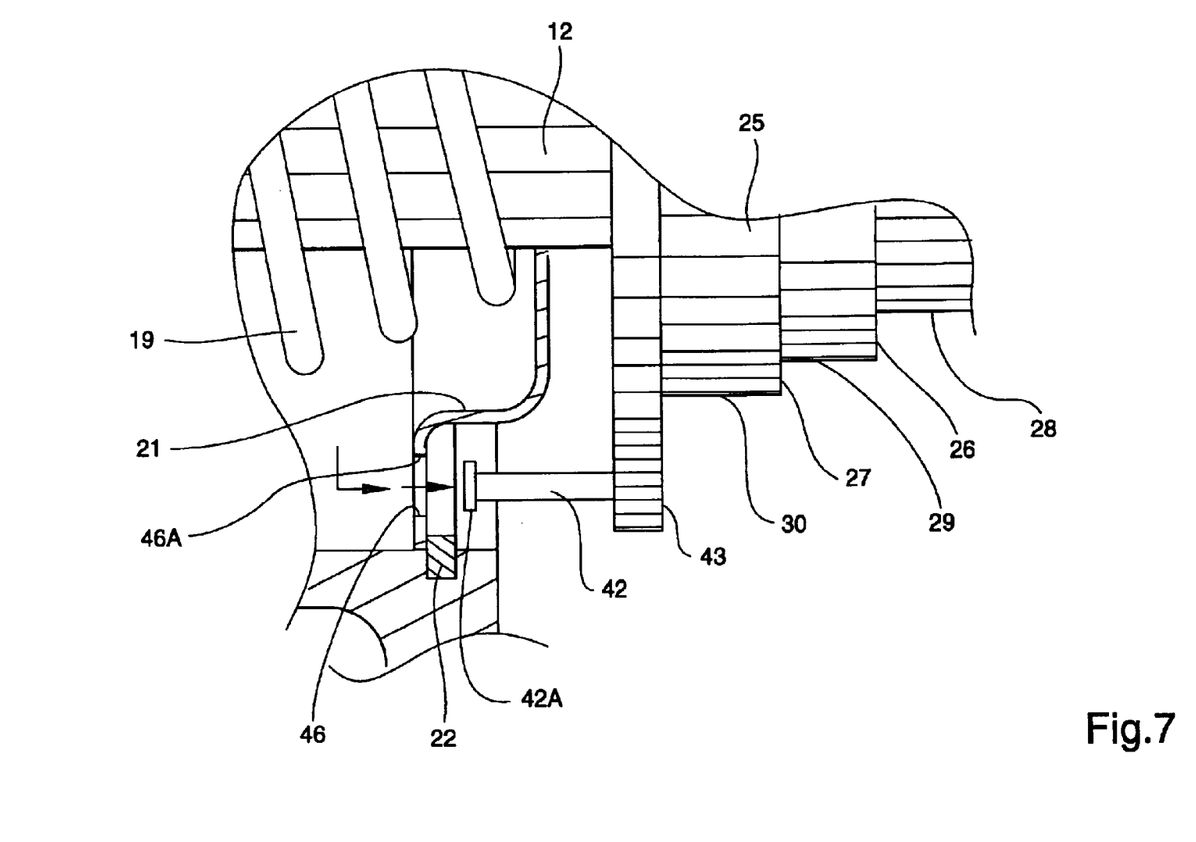
FIG. 7 is a fragmentary cross-sectional view of the centering sleeve and locating hub, and showing the locking bolt in alignment with the enlarged portion of the opening in the spring cover, and passing through the spring cover to remove the sleeve from the balancer.

Referring to FIGS. 5–7, in order to prevent the centering sleeve 25 from becoming frictionally lodged within the center hole 14 of the wheel 11, means are provided for releasably locking the sleeve 25 to the wheel balancer 10 such that the sleeve 25 remains secured to the balancer 10 upon removal of the wheel 11 from the centering shaft 12. According to one preferred embodiment, the releasable locking means includes a pair of locking bolts 41 and 42 depending from an annular flange 43 at the base of the centering sleeve 25. The bolts 41 and 42 have respective enlarged heads 41A and 42A adapted for extending through complementary openings 45 and 46 formed in the spring cover 21. As shown in FIG. 6, each opening 45, 46 has an enlarged portion 45A, 46A slightly larger than the diameter of the bolt head 41A, 42A, and a narrow portion 45B, 46B communicating with the enlarged portion 45A, 46A. For example, the diameter of the bolt head 41A, 42A may be 10 mm with the diameter of the enlarged portion 45A, 46A being 12 mm. The narrow portion 45B, 46B is sufficiently wide to accommodate the neck of the bolt 41, 42, and sufficiently narrow to prevent passage of the bolt head 41A, 42A. For example, the diameter of the bolt 41, 42 may be 5 mm with the width of the narrow portion 45B, 46B being 5.1 mm. The centering sleeve 25 is applied to the wheel balancer 10 by aligning each of the bolt heads 41A, 42A with corresponding enlarged portions 45A, 46A of the openings 45, 46 in the spring cover 21, pushing the sleeve 25 inwardly towards the spring cover 21, and then rotating the sleeve 25 slightly to locate each of the bolt heads 41A, 42A in the narrow portions 45B, 46B of the openings 45, 46. FIG. 6 shows the centering sleeve 25 in a locked condition with the bolt head 42A rotated to the narrow portion 46B of the opening 46. FIG. 7 shows the bolt head 42A moved into alignment with the enlarged portion 46A of the opening 46, and passing through the spring cover 21 to release the centering sleeve 25 from the wheel balancer 10. Once released, the centering sleeve 25 can be readily and conveniently exchanged with a centering sleeve of a different size in order to accommodate the particular vehicle wheel to be balanced.

In alternative embodiments, the releasable locking means includes any structure suitable for releasably securing the centering sleeve to the wheel balancer. Suitable structure includes one or more locking clips, mating screw threads, interfering shoulders, and the like. For example, the base flange of the sleeve may include a radially-projecting finger adapted to fit within a cut-out formed with the face plate at an inner periphery of the locating hub. In this embodiment, the sleeve is secured to the hub by aligning the finger with the face plate cut-out, inserting the base flange of the sleeve into the hub cavity, and then rotating the sleeve to position the finger in locking engagement against the face plate of the hub.

A vehicle wheel balancer including an improved centering sleeve is described above. Various details of the invention may be changed without departing from its scope. Furthermore, the foregoing description of the preferred embodiment of the invention and the best mode of practicing the invention are provided for the purpose of illustration only and not for the purpose of limitation—the invention being defined by the claims.

I claim:

1. A vehicle wheel balancer for obtaining data relative to the imbalance of a vehicle wheel, said wheel balancer comprising:

(a) a centering shaft having a free end adapted for extending through a center hole of the wheel, and a proximal end opposite the free end;

(b) means for rotating said centering shaft;

(c) a locating hub carried on said shaft and adapted for engaging a first side of the wheel to locate the wheel on said balancer;

(d) a centering sleeve carried on said shaft adjacent said locating hub, and adapted for extending through the center hole of the wheel to center the wheel relative to said shaft;

(e) means for locking said centering sleeve to said wheel balancer, such that said centering sleeve remains secured to said wheel balancer upon removal of the wheel from said shaft; and (f) a mounting member carried on said shaft and adapted for engaging a second side of the wheel, the wheel being sandwiched between said mounting member and said locating hub such that said mounting member, locating hub, and centering sleeve cooperate to secure the wheel in a centered position relative to said shaft during wheel-balancing rotation of the wheel.

2. A vehicle wheel balancer according to claim 1, wherein said locating hub comprises an annular face plate adapted for engaging the wheel, and an integrally-formed cup defining an internal cavity for receiving a portion of said centering sleeve.

3. A vehicle wheel balancer according to claim 2, and comprising a spring positioned within the cavity of said locating hub, and adapted for urging said centering sleeve into the center hole of the wheel.

4. A vehicle wheel balancer according to claim 3, and comprising a floating spring cover movable within the cavity of said locating hub and residing between said spring and centering sleeve.

5. A vehicle wheel balancer according to claim 4, wherein said means for locking said centering sleeve to said wheel balancer comprises a locking bolt extending outwardly from said centering sleeve towards said floating spring cover, and wherein said floating spring cover defines an opening therein for receiving and holding a free end of said locking bolt to secure said centering sleeve to said wheel balancer.

6. A vehicle wheel balancer according to claim 5, wherein said locking bolt comprises an enlarged head, and wherein the opening in said floating spring cover comprises an enlarged portion adapted for receiving the head of said bolt there through and a narrow portion communicating with the enlarged portion, whereby after inserting the bolt head through the enlarged portion of said opening, said centering sleeve is rotated to locate the bolt head along the narrow portion of said opening such that said bolt head engages said floating spring cover to lock said centering sleeve to said wheel balancer.

7. A vehicle wheel balancer according to claim 1, wherein the free end of said centering shaft comprises an external screw thread.

8. A vehicle wheel balancer according to claim 7, and comprising a wing nut applied to the free end of said centering shaft, and having a complementary internal screw thread mating with the external thread of said centering shaft to releasably secure the wheel between said locating hub and mounting member.

9. A wheel centering assembly for a vehicle wheel balancer adapted for obtaining data relative to the imbalance of a vehicle wheel, said wheel centering assembly comprising:

(a) a centering shaft having a free end adapted for extending through a center hole of the wheel, and a proximal end opposite the free end;

(b) a locating hub carried on said shaft and adapted for engaging a first side of the wheel to locate the wheel on said balancer;

(c) a centering sleeve carried on said shaft adjacent said locating hub, and adapted for extending through the center hole of the wheel to center the wheel relative to said shaft;

(d) means for locking said centering sleeve to said wheel balancer, such that said centering sleeve remains secured to said wheel balancer upon removal of the wheel from said shaft; and (e) a mounting member carried on said shaft and adapted for engaging a second side of the wheel, the wheel being sandwiched between said mounting member and said locating hub such that said mounting member, locating hub, and centering sleeve cooperate to secure the wheel in a centered position relative to said shaft during wheel-balancing rotation of the wheel.

10. A wheel centering assembly according to claim 9, wherein said locating hub comprises an annular face plate adapted for engaging the wheel, and an integrally-formed cup defining an internal cavity for receiving a portion of said centering sleeve.

11. A wheel centering assembly according to claim 10, and comprising a spring positioned within the cavity of said locating hub, and adapted for urging said centering sleeve into the center hole of the wheel.

12. A wheel centering assembly according to claim 11, and comprising a floating spring cover movable within the cavity of said locating hub and residing between said spring and centering sleeve.

13. A wheel centering assembly according to claim 12, wherein said means for locking said centering sleeve to said wheel balancer comprises a locking bolt extending outwardly from said centering sleeve towards said floating spring cover, and wherein said floating spring cover defines an opening therein for receiving and holding a free end of said locking bolt to secure said centering sleeve to said wheel balancer.

14. A wheel centering assembly according to claim 13, wherein said locking bolt comprises an enlarged head, and wherein the opening in said floating spring cover comprises an enlarged portion adapted for receiving the head of said bolt therethrough, and a narrow portion communicating with the enlarged portion, whereby after inserting the bolt head through the enlarged portion of said opening, said centering sleeve is rotated to locate the bolt head along the narrow portion of said opening such that said bolt head engages said floating spring cover to lock said centering sleeve to said wheel balancer.

15. A wheel centering assembly according to claim 9, wherein the free end of said centering shaft comprises an external screw thread.

16. A wheel centering assembly according to claim 15, and comprises a wing nut applied to the free end of said centering shaft, and having a complementary internal screw thread mating with the external thread of said centering shaft to releasably secure the wheel between said locating hub and mounting member.

17. A centering sleeve adapted for extending through a center hole of a vehicle wheel mounted on a vehicle wheel balancer to center the wheel relative to a rotatable balancer shaft, said centering sleeve comprising means for locking said sleeve to the wheel balancer, such that said sleeve remains secured to the wheel balancer upon removal of the wheel from the balancer shaft.

18. A centering sleeve according to claim 17, and comprising an enlarged base adapted for engaging a floating spring cover movable within a cavity defined by a locating hub of the wheel balancer.

19. A centering sleeve according to claim 18, wherein said means for locking said centering sleeve to the wheel balancer comprises a locking bolt extending outwardly from said base, and adapted for being inserted and held within an opening formed with the floating spring cover to secure said centering sleeve to the wheel balancer.

* * * * *